United States Patent
Bergey

(10) Patent No.: US 10,371,858 B2
(45) Date of Patent: Aug. 6, 2019

(54) METHOD OF SUBSURFACE MODELLING

(71) Applicant: Total S.A., Paris (FR)

(72) Inventor: Pierre Bergey, Saint Germain en Laye (FR)

(73) Assignee: Total S.A., Courbevoie (FR)

( * ) Notice: Subject to any disclaimer, the term of this patent is extended or adjusted under 35 U.S.C. 154(b) by 49 days.

(21) Appl. No.: 15/039,130

(22) PCT Filed: Nov. 20, 2014

(86) PCT No.: PCT/EP2014/075192
§ 371 (c)(1),
(2) Date: May 25, 2016

(87) PCT Pub. No.: WO2015/078773
PCT Pub. Date: Jun. 4, 2015

(65) Prior Publication Data
US 2017/0023700 A1    Jan. 26, 2017

(30) Foreign Application Priority Data

Nov. 26, 2013 (GB) ................................. 1320815.2

(51) Int. Cl.
*G01V 99/00*    (2009.01)
*G06F 17/11*    (2006.01)

(52) U.S. Cl.
CPC ............ *G01V 99/005* (2013.01); *G06F 17/11* (2013.01)

(58) Field of Classification Search
CPC ...... G01V 99/005; G01V 99/00; G06F 17/11; E21B 49/00

(Continued)

(56) References Cited

U.S. PATENT DOCUMENTS 8,335,677 B2 * 12/2012 Yeten ..................... E21B 43/00
                                                                         703/10
2007/0016389 A1    1/2007    Ozgen
(Continued)

FOREIGN PATENT DOCUMENTS

WO    WO-2008036664 A2    3/2008

OTHER PUBLICATIONS

Vollmer, Thorsten, "International Search Report," prepared for PCT/EP2014/075192, dated Apr. 2, 2015, three pages.

*Primary Examiner* — Eunhee Kim
(74) *Attorney, Agent, or Firm* — Winstead PC

(57) ABSTRACT

Disclosed is a method of modelling a subsurface volume. History data for one or more parameters over a first period of time is obtained. The first period of time comprises a plurality of schedule periods, each schedule period having associated with it a sampled value of the considered parameter at the corresponding time. A merge error value is attributed to plural pairs of consecutive schedule periods, the merge error value representing a magnitude of the error in a merged value of each parameter over the duration corresponding to a pair of schedule periods being considered, relative to the sampled values for said pair of schedule periods being considered. The pair of schedule periods which have the smallest error value attributed thereto is merged, and the merged schedule period has attributed to it, the corresponding merged value of the corresponding parameter. The error value calculation and merger steps are repeated so as to reduce the total number of schedule periods.

20 Claims, 4 Drawing Sheets

(58) Field of Classification Search
USPC .................................... 703/1, 2, 10; 702/6
See application file for complete search history.

(56) References Cited

U.S. PATENT DOCUMENTS

| | | | |
|---|---|---|---|
| 2008/0082469 A1* | 4/2008 | Wilkinson | E21B 43/00 706/13 |
| 2011/0054859 A1 | 3/2011 | Ding et al. | |
| 2016/0312607 A1* | 10/2016 | McNealy | E21B 41/0092 |

\* cited by examiner

METHOD OF SUBSURFACE MODELLING

The present disclosure relates to methods of subsurface modelling and in particular to such methods for modelling the behaviour of a subsurface hydrocarbon reservoir using history matching techniques.

Subsurface Models

Subsurface models may comprise, for example, reservoir flow, basin, and geo-mechanical models. These comprise gridded 3D representations of the subsurface used as inputs to a simulator allowing the prediction of a range of physical properties as a function of controlled or un-controlled boundary conditions.

One type of subsurface model is the reservoir flow model. This aims to predict reservoir dynamics, i.e. fluid flow properties. These may include 3D pressure and saturation, multi-phase rates (and composition) and temperature, under oil and gas field or aquifer development scenarios.

Reservoir model assisted history match is a class of inversion processes. Inversion processes typically involve using solver algorithms along various observation and model input parameterization schemes.

Solver algorithms are used to minimize an objective function measuring the difference between real and simulated observations. Simulated observations are obtained by simulating historic reservoir production conditions using a flow simulator and a 3D reservoir model as input.

In a history match context, operating conditions are derived from production history. Production history is commonly available as high frequency data, typically on a daily basis.

Reservoir model history matching is computationally demanding due to the large number of simulation runs involved (especially when using Assisted History Match methods) and the constantly increasing complexity of models. A common solution is to simplify the history by imposing as rate boundary condition: weekly, monthly or yearly average rate values instead of daily. Such periods may be regularly or semi-regularly spaced in time (months and years may be defined by their calendar lengths, with months comprising 28, 29, 30 or 31 days and years 365 or 366 days etc.). Whatever the support of information chosen, rates are averaged over the coarsened period to respect cumulated historic production.

In general, actual historic rate variations are not regularly spaced over time. As a consequence the simulated pressure loses the higher part of its frequency content. Lower input rate frequency content determines lower pressure output frequency content. This is detrimental to match activities because pressure is typically measured at wells. Due to Darcy's law, high frequency pressure changes are related to near wellbore properties while lower frequency changes relate to the reservoir properties integrated over a larger distance from well. The loss of simulated pressure frequency content limit our ability to precisely invert near vs. far wellbore properties from pressure observations.

Therefore, imposing rates averaged over a coarse schedule (support of time information) will deteriorate, often substantially, the character of the simulated pressure and thus impact the history matching process. It is an aim of the present invention to address this issue.

SUMMARY OF INVENTION

In a first aspect of the invention there is provided a method of modelling a subsurface volume comprising the steps of: 1) obtaining history data of at least a first parameter over a first period of time, said first period of time comprising a plurality of schedule periods, each schedule period having associated with it a sampled value of the first parameter at the corresponding time; 2) attributing a merge error value to plural pairs of consecutive schedule periods, said merge error value representing a magnitude of the error in a merged value of said first parameter over the duration corresponding to a pair of schedule periods being considered, relative to the sampled values for said pair of schedule periods being considered; 3) merging the pair of schedule periods which have the smallest error value attributed thereto, and attributing to this merged schedule period the corresponding merged value of said first parameter; and 4) repeating steps 2) and 3) thereby reducing the total number of schedule periods.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Disclosed is a method by which a finely discretised multi-well (or multi-perforation set or multi-group), multi-parameter history is upscaled into a coarser support of information while better conserving the frequency content of simulated pressure compared to previous methods.

The method comprises creating schedules with a reduced number of rate setting dates while preserving the character of simulated pressure. It aims at minimizing the simulation time while maximizing simulated pressure information content. Its usefulness should apply in all history match cases (manual and assisted) in which simulation computational time represents a significant limitation to the match process.

In essence the method involves reducing the number of rate setting dates (that is the number of periods for which boundary conditions are set) such that the duration of each period varies, each duration being largely dependent upon activity during that period. Longer durations of time during which there is little variation in the measured rates result in a corresponding rate setting period(s) that may be relatively long. The rate attributed to the long period may be the average of the measured rates covered by the long period. However, where there is significant measured rate change variation over a shorter duration, the rate setting periods may be also be shorter over this period. This better reflects the high-frequency changes and reduces averaging over such periods.

The method is based upon an iterative process. It operates by progressively merging time periods starting from the input, finely defined rate history. At any given iteration, a merge error value associated with each potential merge location is evaluated at every well and summed up for each potential merge across all wells. The merge location is defined for the iteration considered by the location of the smallest induced error.

The algorithm is fast beyond the first iteration because merging two periods does not modify the merging error associated to periods not involved by the merge operation. The process is repeated until the desired number of time steps or desired error level is reached.

Figure 1:
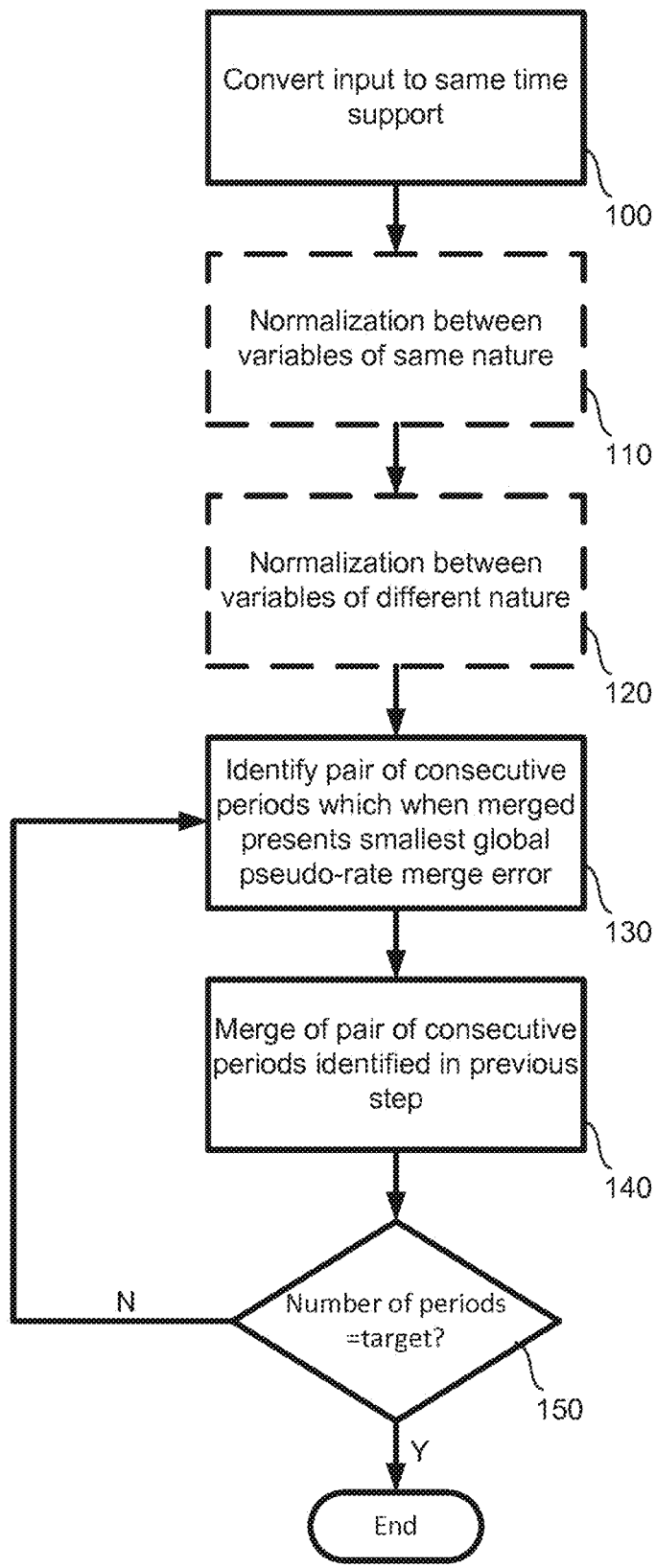
FIG. 1 comprises a flowchart describing a method according to an embodiment of the invention.

FIG. 1 is a flowchart illustrating such a method. At step 100, all input measured quantity vectors are converted so that they are all on the same support of time information.

The input data may consist of sets of fully valued vectors of dates [1 to N] and associated vectors of quantities measured at wells between consecutive dates [1 to N−1]. These quantities, which are used as input in the method, are quantities that can also be simulated by the reservoir simulator and matched in a history matching process.

The conversion to the same support of time information may be performed by defining a new time vector containing all different dates present in all the date input vectors. Each date is present only once. This should be done for:
  every well,
  every defined measured quantity for a considered well,
  all dates in the new dates vector, In each case, the value of the input measured quantity for the date immediately preceding or equal to a considered date is the value attributed to that considered date for the new support of information.

Step 110 is an optional step of normalization between variables of the same nature. Step 110 is usually possible, and where it is possible it is recommended. The variables having the same nature may be rate variables. A rate variable is always present in the problem being considered, and usually there are several rate variables. The normalization proposed for rate variables is a transformation to reservoir or bottom hole conditions by means of a simplified thermodynamic model. Typically normalization between variable of same nature will be a simple summation, but for other types of variables, other normalization techniques may be used.

Step 110 may comprise a rate normalization to estimated bottom hole or reservoir conditions, so as to estimate a global (multiphase) rate at bottom hole conditions. This operation is performed only once. It may be applicable to oil, water, gas rate data (or a subset thereof). The operation can be performed using a simplistic PVT approach as described hereafter or can be completed using more sophisticated multiphase thermodynamics approaches.

Darcy's law shows a relationship between pressure and rate at reservoir conditions. As the objective of scheduling method disclosed herein is to ensure similarity between observed and simulated pressures, normalization to reservoir conditions appears a logical default approach (leaving the user responsible only for the input of a priori weights only for ancillary parameters such as pressures).

It should however be noted that the transformation to reservoir conditions is used only for the purpose of computing weights for the selection of timesteps and that the scheduling results (a rate history between irregularly spaced dates) is always expressed at surface conditions. Total cumulated volumes over the history period are unchanged by this approach.

Rates are commonly provided to the simulator in terms of surface conditions; this step transforms them to reservoir conditions. Considering the usage of such reservoir condition rates (weight in the selection of time-steps), an approximated approach is totally acceptable.

Figure 2:
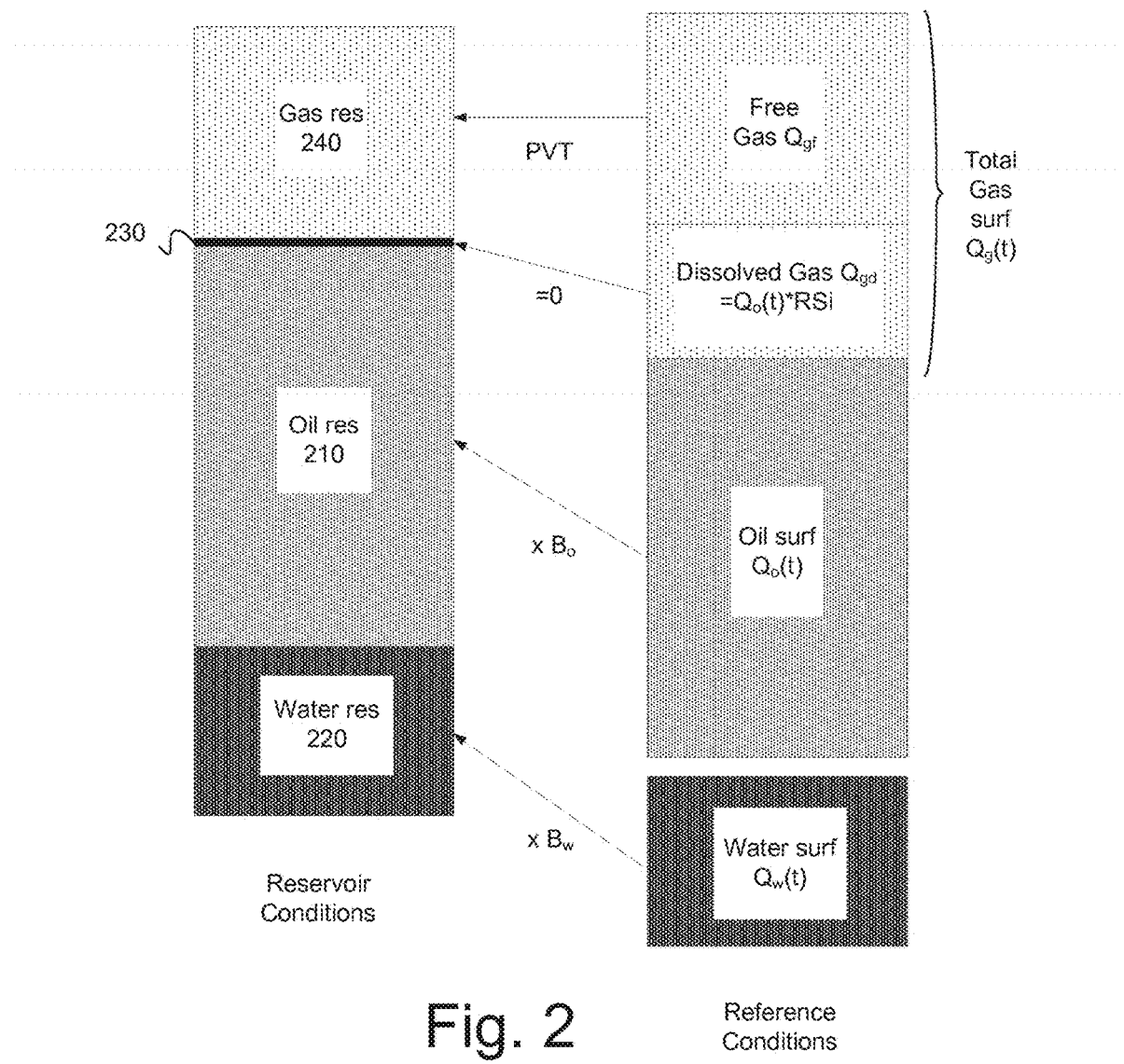
FIG. 2 is a schematic diagram graphically illustrating the optional normalisation step of FIG. 1.

FIG. 2 illustrates this step. To perform a bottom hole condition normalization the following input should be used:
  Oil rate at reference (surface) conditions $Q_o(t)$ on reference support of time information
  Water rate at reference (surface) $Q_w(t)$ conditions on reference support of time information
  Gas rate $Q_g(t)$ at reference conditions on reference support of time information In addition some parameters should be estimated. They can be provided on a well by well or group of well basis:
  Estimated reference gas content in oil RSi
  Estimated oil formation volume factor $B_o$
  Estimated water formation volume factor $B_w$
  Estimated pressure history as a function of time P(t)

The approach selected relies upon the following hypothesis:

Constant $B_o$ and $B_w$ for oil and water rates, which are simply multiplied respectively with the oil rate at surface conditions $Q_o(t)$ and the water rate at surface conditions $Q_w(t)$ to obtain the oil rate at reservoir conditions 210 and water rate at reservoir conditions 220.

For the gas rate, the following are distinguished:
  Gas that is coming out of solution downstream from the wellbore during production $Q_{gd}$. Quantities are estimated from a reference gas content of oil [gas-oil ratio GOR, for which the initial gas content RSi is expected to be a decent default value], and can therefore be obtained from the product of the oil rate at surface conditions $Q_o(t)$ and RSi. All gas below this reference GOR is considered as coming out of solution downstream of the wellbore. Such gas is estimated to have no reservoir volume 230.
  Free gas in the reservoir $Q_{gf}$. All gas above the aforementioned reference GOR is considered as free gas in reservoir. It is then possible to use the pressure and temperature to calculate the gas rate at reservoir condition 240 assuming a perfect gas and using Boyle's law: $G_{res}=(T_{res}/T_{ref})*(Q_{gf}/P_{res})$, where, $Q_{gf}$ is the free gas rate, $T_{res}$ and $T_{ref}$ is the temperature at reservoir and reference conditions respectively and $P_{res}$ is the pressure at reservoir conditions.

For ease of comparing merging errors of each consecutive pair (as will be described below), the phase rates may be summed (or otherwise combined) to obtain an estimated multiphase reservoir rate $Q_{BHP}(t)$. $Q_{BHP}(t)$ may be estimated using the following formula:

$$Q_{BHP}(t) = Q_o(t) \cdot B_o + Q_w(t) \cdot B_w + \frac{\text{Max}(0, Q_g(t) - Q_{o(t)} \cdot RS_i)}{P(t)}$$

Step 120 is an optional step, which is recommended whenever variables of differing natures are present. It comprises normalization across normalized variables of differing natures. By convenience rates are used as reference and are not normalized (as rates always exist and constitute the majority of the data); the result of the normalization at this step can therefore be designated by a "pseudo-rate". It typically relies upon a simple transform (e.g. multiplication by a weighting constant) applied to the parameter. The weighting constant used to normalize a variable to a pseudo-rate will reflect the importance given to the considered parameter's variations compared to the rates' variations.

At step 120, a normalization of additional input variables is performed and a pseudo-rate computed. This operation is performed only once. Input can be any physical quantity measured at well over time and that can be simulated by a reservoir simulator (oil/water/gas rates [or derived quantities such as gas-oil ratio, water cut, etc], water salinity, tracer concentration, oil composition, etc). It is recommended to use the normalization procedure of step 110 for oil, water and gas rates (and not use derived quantities).

The output is referred hereafter as pseudo-rate Qp(t), as it does not necessarily represent actual rates, although it often will. It is a single time function consisting of the weighted sum of reservoir history match drivers. Qp(t) may be computed using the following normalizing approach:

$$Q_p(t) = \sum_{i=1}^{i=n} \alpha_i \left( \frac{A_i(t) - A_{i-min}}{A_i(t) - A_{i-max}} \right)$$

Where $A_i(t)$ represents a physical quantity measured at well $A_{i-min}$ represents the minimum of $A_i(t)$ over the historical period considered $A_{i-max}$ represents the maximum of $A_i(t)$ over the historical period considered $\alpha_i$ represents the weighting constant Weighting constant can be chosen by user with consideration to the importance of matching transient of the considered measured quantity relative to the other considered quantities (e.g. measured rates).

At step 130, a pair of consecutive periods is identified which, when merged, result in the smallest global pseudo-rate merge error value. This operation is performed recursively typically until the desired number of rate periods are obtained.

Figure 3:
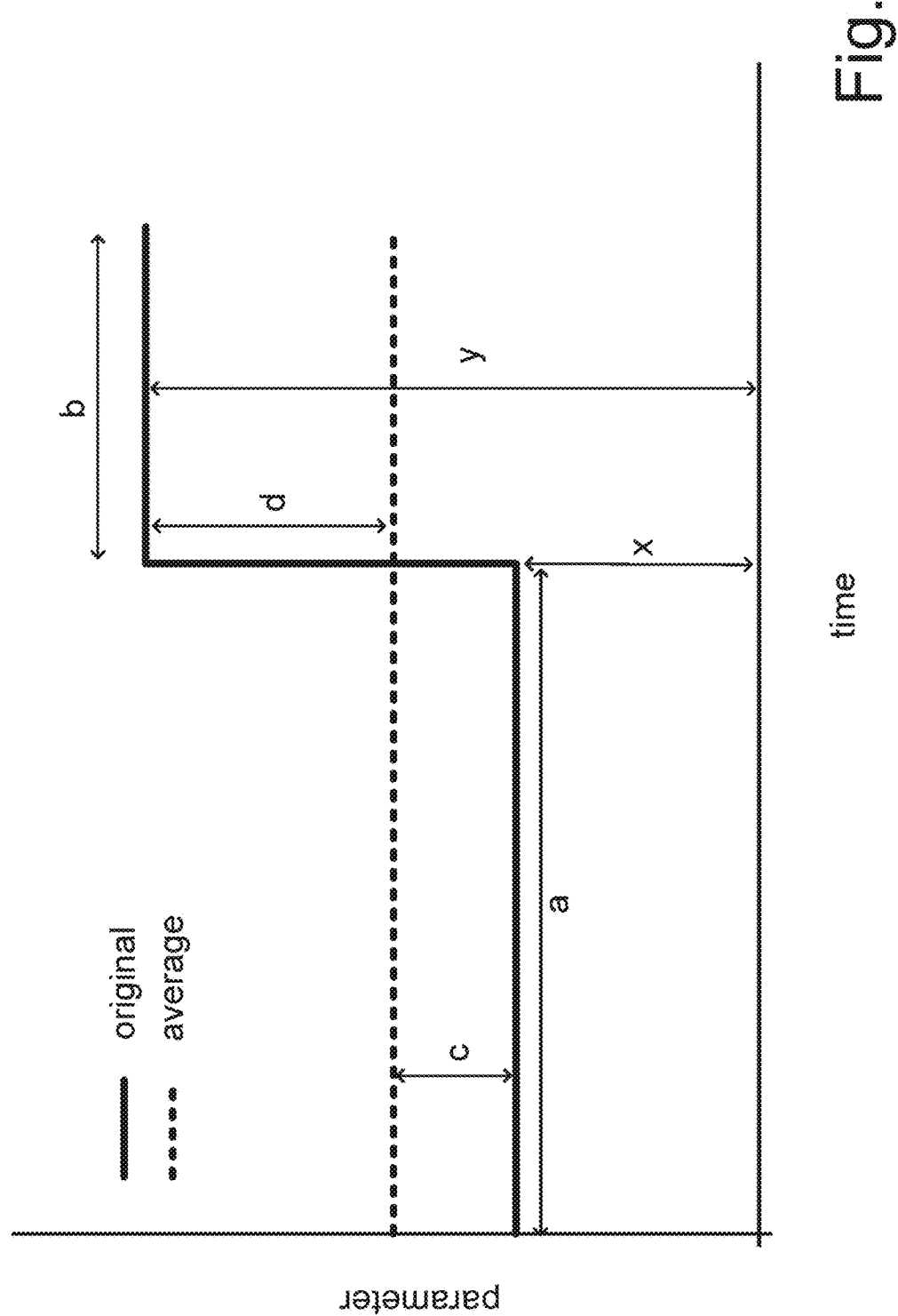
FIG. 3 is a graph illustrating how the merge error value may be calculated.

The merge error value may be defined as the sum of the square of difference between the average of the pseudo rates over the merged period and the pseudo rate for each input period for each well, weighted by the duration of said period. This is illustrated on the graph of FIG. 3. The solid line is the input rate values prior to merger, and the broken line the average of these rates. Referring to the graph, calculation of the average can be calculated by the formula (ax+by)/(a+b), and the merge error calculated using $a \cdot c^2 + b \cdot d^2$.

The pair of consecutive periods which, when merged, result in the smallest merge error is then determined by a systematic review of all consecutive pairs.

It is possible in such process to exclude merging across specific dates by introducing a specific check of whether the considered date can be merged across at this stage. This can be of interest in the context of reservoir simulation history match to introduce irregularly timed observation of interest (e.g. RFT, PLT).

At step 140, the identified pair of consecutive periods which present the smallest merge error value are merged. The merge is operated by computing, for each surface quantity (not the pseudo-rate), the arithmetic average of the measured surface quantity over the considered period. The average may be calculated per phase and average ancillary variable per averaged period. Consequently, it should be appreciated that steps 110 and 120 (if performed) are performed only to aid determination of the periods to be merged (step 130), merger is not performed for the pseudo rates or rates according to reservoir conditions.

At step 150, a check is performed to determine whether the number of periods now meets a predetermined target. For example, it may be determined beforehand that the number of periods should be the same as would have been obtained with monthly averaging (an average of 12 rate periods a year, a 30 times reduction if the input rate periods are of daily duration). If the number of periods is still greater than the target, steps 130, 140 and 150 are repeated. When the number of periods equals the target, the schedule is complete and the routine stops.

Figure 4:
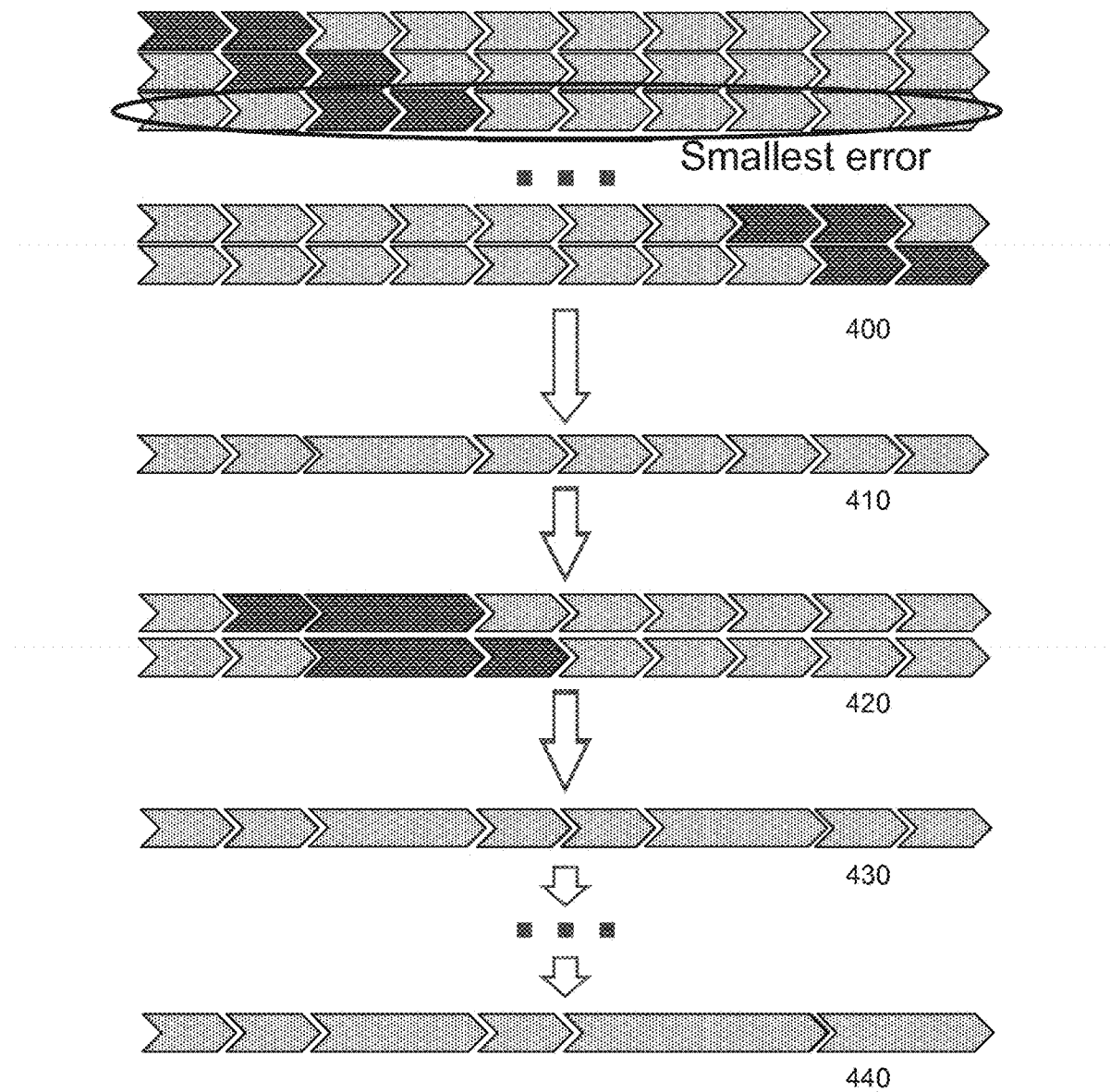
FIG. 4 is a schematic diagram graphically illustrating the process described by steps 130 to 150 of FIG. 1.

FIG. 4 graphically illustrates the process described by steps 130 to 150. At step 400, a merge error value for each pair of consecutive rate periods is calculated, the merge error value corresponding to the error which would result if the two periods are merged. This is done for every pair of consecutive periods, or at least every pair of periods for which merger is allowed (some periods may be forbidden from merger for a number of reasons) and the pair of consecutive periods for which the smallest error value is identified At step 410, this identified pair for which the smallest merge error value has been calculated is merged together and a new schedule generated. At step 420, merge error values for merger of the newly merged period respectively with each one of the periods immediately adjacent it are calculated. It will be appreciated that these newly calculated merge error values are the only error values unknown at the beginning of step 420, and the error values calculated at step 400 continue to be valid for all steps unaffected by the merger at step 410. The smallest error is again determined for the schedule of step 410, using the merge error values calculated at step 400, and at step 420 for the new pairs. Once again, the pair of consecutive periods with the smallest merge error value is merged and a new schedule generated (step 430). Steps 420 and 430 are then repeated until the desired number of periods remain, after which the final schedule is generated (step 440).

It should be appreciated that reduction of the number of periods using the methods disclosed herein only provide a benefit where the reduction is not too great. It has been shown that a reduction by a factor of 30 (mirroring monthly averaging from daily data) provides clear benefit over monthly averaging in a range of realistic field conditions. Reductions that are orders of magnitude greater than 30 may actually not shown any real improvement over present fixed period averaging techniques.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method of extracting hydrocarbons from a subsurface reservoir, the method comprising:
   obtaining history data of at least a first parameter over a first period of time, said first parameter relating to a fluid rate within the subsurface hydrocarbon reservoir, said first period of time comprising a plurality of schedule periods, each schedule period having an associated sampled value of the first parameter at a corresponding time;
   attributing a merge error value to plural pairs of consecutive schedule periods, said merge error value representing a magnitude of the error in a merged value of said first parameter over a duration corresponding to a pair of schedule periods being considered, relative to the sampled values for said pair of schedule periods being considered;
   merging the pair of schedule periods which have the smallest error value attributed thereto, and attributing to this merged schedule period a corresponding merged value of said first parameter;
   repeating steps 2) and 3) thereby to generate a new schedule with a reduced number of schedule periods, thereby reducing simulation computation time;
   modelling the subsurface hydrocarbon reservoir to obtain model data relating to the first period of time;
   using the history data described in terms of the reduced number of schedule periods in a history matching process which matches the modelled data with the history data, so as to predict fluid flow properties relating to the first parameter within the subsurface hydrocarbon reservoir; and
   using the predicted fluid flow properties to extract hydrocarbons from the subsurface hydrocarbon reservoir.

2. The method as claimed in claim 1, wherein said merged value of said first parameter comprises an average value of said first parameter over the duration corresponding to the pair of schedule periods being considered.

3. The method as claimed in claim 1, wherein during a first iteration of steps 2) and 3), step 2) comprises:
   calculating a merge error value for each of said plural pairs of consecutive schedule periods; and
   subsequent to the first iteration of steps 2) and 3), step 2) comprises:
      only calculating a merge error value for the pairs of consecutive schedule periods comprising the schedule period formed by a merger performed in a previous iteration; and
      attributing previously calculated merge error values to the remaining pairs of said plural pairs of consecutive schedule periods.

4. The method as claimed in claim 1, wherein said steps 2) and 3) of said method are repeated until the total number of schedule periods is reduced to a predetermined number, or by a predetermined factor.

5. The method as claimed in claim 4, wherein said predetermined number is between 10 and 100.

6. The method as claimed in claim 4, wherein said predetermined number is in a region of 30.

7. The method as claimed in claim 1 comprising the step of normalising said sampled values of at least said first parameter to estimated reservoir or bottom hole conditions.

8. The method as claimed in claim 7, wherein said normalisation is performed on said sampled values of parameters of a similar nature.

9. The method as claimed in claim 8, wherein said normalisation comprises a summation of said parameters estimated to reservoir or bottom hole conditions.

10. The method as claimed in claim 7, wherein said at least a first parameter comprises two or more of water rate, gas rate and oil rate at surface conditions, and said normalisation results in a single multiphase rate at estimated reservoir or bottom hole conditions.

11. The method as claimed in claim 1 comprising the step of normalising said sampled values of said at least said first parameter, wherein said at least said first parameter comprises parameters of differing natures.

12. The method as claimed in claim 11, wherein rates are used as reference when normalising said sampled values of parameters of differing natures.

13. The method as claimed in claim 12, wherein said normalising said sampled values of parameters of differing natures is performed by way of a transform using a weighting constant reflecting importance given to a considered parameter's variations compared to a reference rates' variations.

14. The method as claimed in claim 7, wherein step 2) is performed on normalised values and step 3) is performed on the original unnormalised sampled values.

15. The method as claimed in claim 1, wherein said plural pairs of consecutive schedule periods comprise every pair of consecutive schedule periods for which merger is allowed.

16. The method as claimed in claim 1, wherein said subsurface hydrocarbon reservoir is a reservoir comprising a plurality of wells and a merge error value is evaluated for each of plural pairs of consecutive schedule periods at every well, and summed up for each potential merge across all wells.

17. The method as claimed in claim 1 further comprising the step of using results of said method to aid hydrocarbon recovery from a reservoir.

18. A computer program comprising computer readable instructions which, when run on suitable computer apparatus, cause the computer apparatus to perform the method of claim 1.

19. A computer program carrier comprising the computer program of claim 18.

20. A computer apparatus specifically adapted to carry out the steps of the method as claimed in claim 1.

* * * * *